(12) United States Patent
Pemberton (10) Patent No.: US 9,745,006 B2
(45) Date of Patent: Aug. 29, 2017

(54) UPRIGHT RECEIVER ASSEMBLY FOR ATTACHMENT TO TRAILER AND METHODS OF USE

(71) Applicant: David Pemberton, Woodland, WA (US)

(72) Inventor: David Pemberton, Woodland, WA (US)

( * ) Notice: Subject to any disclaimer, the term of this patent is extended or adjusted under 35 U.S.C. 154(b) by 161 days.

(21) Appl. No.: 14/814,472

(22) Filed: Jul. 30, 2015

(65) Prior Publication Data
US 2016/0031377 A1 Feb. 4, 2016

Related U.S. Application Data

(60) Provisional application No. 62/031,610, filed on Jul. 31, 2014.

(51) Int. Cl.
*B60R 9/06* (2006.01)
*B62D 63/08* (2006.01)

(52) U.S. Cl.
CPC ............... *B62D 63/08* (2013.01); *B60R 9/06* (2013.01)

(58) Field of Classification Search
CPC .. B62D 63/08; B60R 9/00; B60R 9/06; B60R 2011/004; B60R 2011/0078; B60R 11/00; B60D 1/52; B60D 1/485; B60D 1/58
USPC ........................................ 224/488, 519, 567
See application file for complete search history.

(56) References Cited

U.S. PATENT DOCUMENTS

| | | | | |
|---|---|---|---|---|
| 2,497,597 A * | 2/1950 | Gatewood | ................ | B60P 3/36 224/401 |
| 4,394,947 A * | 7/1983 | Tartaglia | ................... | B60R 9/06 224/519 |
| 5,219,105 A * | 6/1993 | Kravitz | .................... | B60R 9/06 224/500 |
| 5,680,975 A * | 10/1997 | Stapleton | ................... | B60R 9/06 224/519 |
| 6,089,428 A * | 7/2000 | Wagner | ..................... | B60R 9/10 224/401 |
| 6,474,522 B1 * | 11/2002 | Johnson | .................... | B60R 9/06 224/514 |
| 6,969,090 B1 * | 11/2005 | Works | ...................... | B60D 1/06 280/407 |
| 9,333,822 B1 * | 5/2016 | LaFave | ...................... | B60R 9/10 |
| 2005/0247747 A1 * | 11/2005 | Henry | ....................... | B60R 9/06 224/401 |
| 2006/0175369 A1 * | 8/2006 | Vermette | ................... | B60R 9/06 224/501 |
| 2013/0092714 A1 * | 4/2013 | Niemi | ....................... | B60P 3/10 224/401 |
| 2014/0144961 A1 * | 5/2014 | Hill | .......................... | B60R 9/00 224/401 |

* cited by examiner

*Primary Examiner* — Nathan J Newhouse
*Assistant Examiner* — Phillip Schmidt
(74) *Attorney, Agent, or Firm* — Baumgartner Patent Law; Marc Baumgartner (57) ABSTRACT

Upright receiver assemblies for attaching to trailers and acting as hitches are disclosed herein. The upright receiver assemblies include (a) an upright and (b) a base, both pieces being releasably attachable to each other. The upright contains a vertical post have a top positioned receiver while the base includes a center plate, two cross bars, and two angled side plates.

12 Claims, 10 Drawing Sheets

UPRIGHT RECEIVER ASSEMBLY FOR ATTACHMENT TO TRAILER AND METHODS OF USE

CROSS-REFERENCE TO RELATED APPLICATIONS

This application claims priority to U.S. Provisional Application No. 62/031,610 titled UPRIGHT RECEIVER ASSEMBLY FOR ATTACHMENT TO TRAILER AND METHODS OF USE, filed Jul. 31, 2014 which is expressly incorporated by reference in its entirety.

FIELD OF THE INVENTION

The embodiments herein relate to an upright receiver assembly configured to be attached to a travel/utility trailer. More specifically, the upright receiver assemblies described herein can be used to attach bike racks, cargo carriers, and the like a trailer.

BACKGROUND

When towing a travel/utility trailer, users will often attach a bike rack or a cargo rack to the back of the trailer. This can be problematic as the rear bumper and/or ladders of some trailers are not configured to be used with racks. The additional weight can result in the rear attached racks falling off while driving, thereby damaging the attached goods (e.g., bikes, cargo) and creating a dangerous road hazard for other drivers. While some trailers do have a rear-positioned receiver to use for racks, a driver is still not able to view the attached cargo/bikes through their rear-view mirror as the sleeping enclosure of the trailer obstructs the view. Thus, the driver cannot intermittently check to see if their load may have shifted while driving in order to prevent the cargo from completely falling off. Additionally, a rear-positioned configuration can still cause severe damage to the trailer bumper. Furthermore, most bike carrier manufacturers won't warranty their devices if mounted on the rear of a trailer because of the bounce potential and safety concerns.

Figure 9:
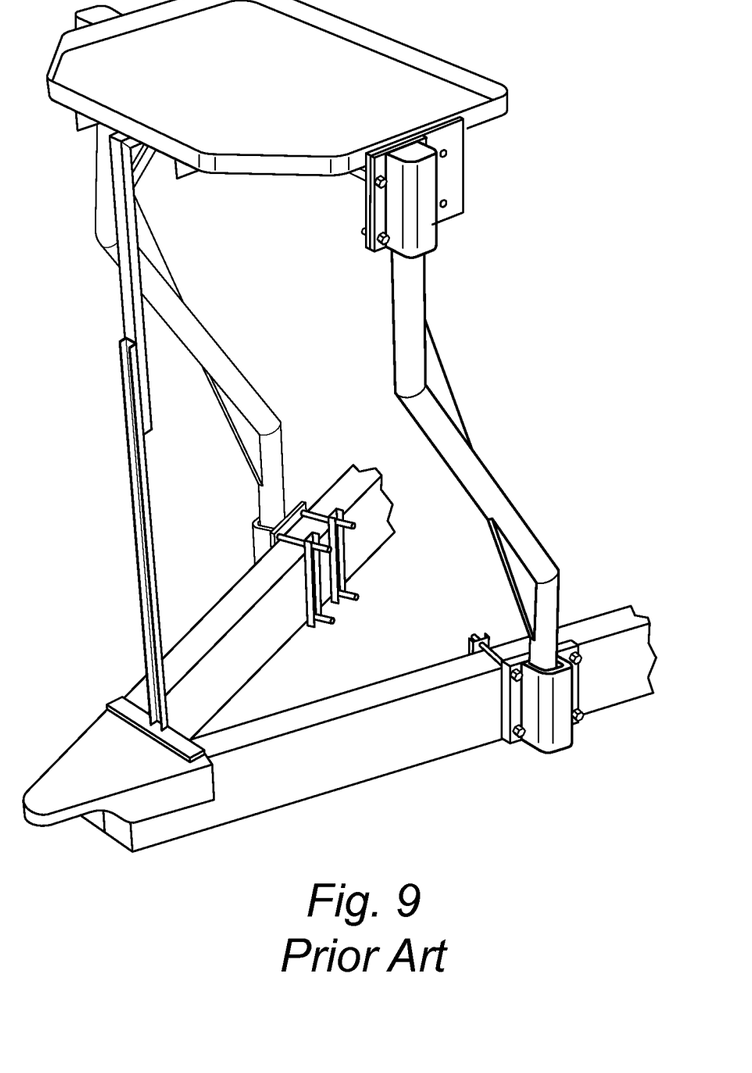
FIG. 9 is a perspective view of a first prior art trailer attachment.
Figure 10:
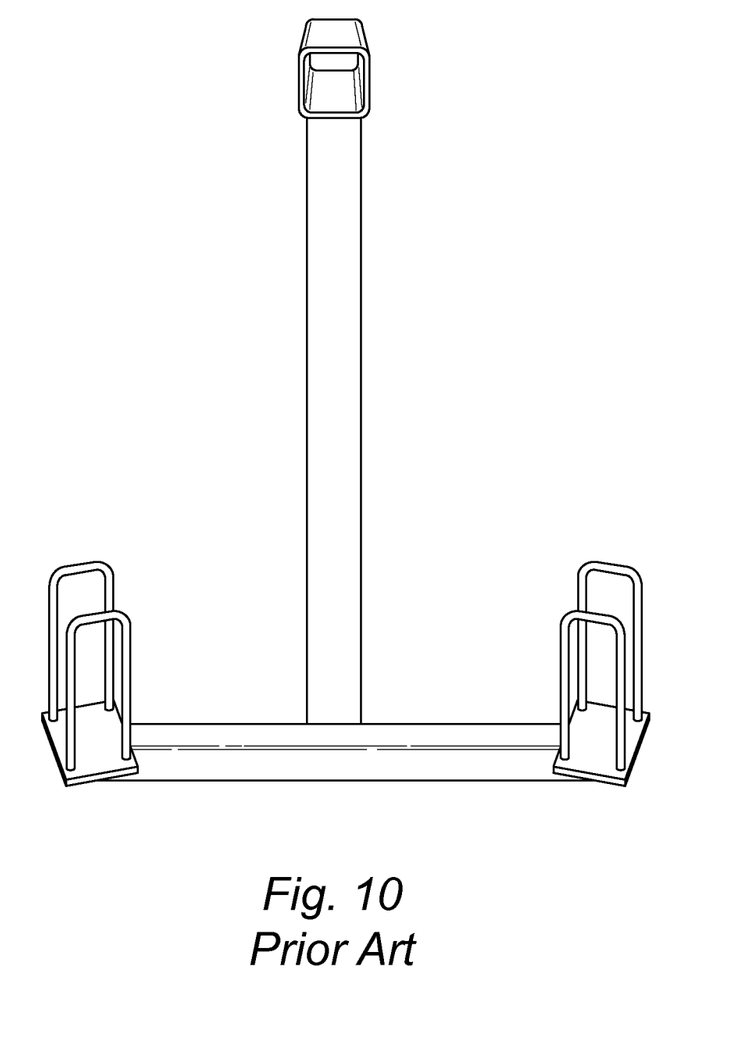
FIG. 10 is a front view of a second prior art trailer attachment.
Figure 11:
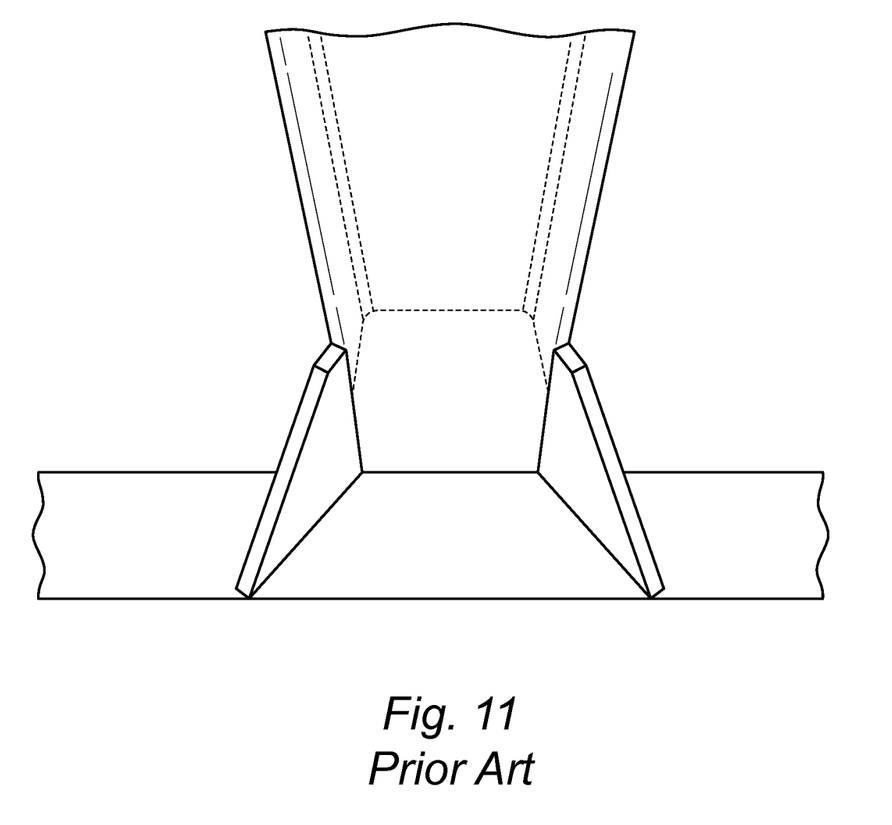
FIG. 11 is a close up view of a second prior art trailer attachment.

A prior art single piece upright receiver configured to be attached to the front of a trailer is shown in FIGS. 10 and 11. As shown, the upright piece is welded to the single horizontal bar. This design was very unstable and wobbles during use. Additional disadvantages is that it is fabricated as a single piece and thus makes storing and installation cumbersome and shipping expensive. FIG. 9 shows a complicated trailer attachment that appears to only be adapted for a cargo tray, not a bike rack.

Accordingly, there is a need in the art to provide secure receivers that can be easily mounted and removed from the front of a trailer to couple to racks configured to carry additional cargo. This will allow drivers to be able to view their attached cargo in the rear view mirror any time they like while they are driving. Carried cargo can non-exclusively include camping gear, firewood, bikes, gas cans, and the like.

SUMMARY OF THE INVENTION

Preferred embodiments are directed to an upright receiver assembly for attachment to a trailer comprising a base comprising a center plate having the following sides: top, under, front, back, left, and right, and coupled to front and rear cross bars, that are parallel to one another and individually extend outwardly from the left and right side of the center plate; wherein the left extensions of the cross bars couple to a left side plate and the right extensions of the cross bars couple to a right side plate, wherein the right and left side plates are angled inward with respect to each other in front of the center plate have slots configured to receive a U-bolt; and an upright having a post that extends upwardly and a receiver hitch positioned at or near the top of the post with a forward facing opening, the post having a lower end configured to be releasably attachable to the top side of the center plate.

Additional embodiments are directed to a travel trailer comprising an enclosure configured for people to sleep or live inside; an A-frame tongue positioned in front of the enclosure having converging left and right sides; a base configured to be releasably attachable to the A-frame tongue comprising a center plate having the following sides: top, under, front, back, left, and right, and coupled to front and rear cross bars, that are parallel to one another and individually extend outwardly from the left and right side of the center plate; wherein the left extensions of the cross bars couple to a left side plate and the right extensions of the cross bars couple to a right side plate, wherein the right and left side plates are angled inward with respect to each other in front of the center plate have slots; wherein the left and right side plates are positioned underneath the left and right sides of the A-frame tongue and U-bolts are positioned over the left and right sides of the A-frame tongue and through the slots of the left and right side plates; and an upright having a post that extends upwardly and a receiver hitch positioned at or near the top of the post with a forward facing opening, the post having a lower end configured to be releasably attachable to the top side of the center plate.

BRIEF DESCRIPTION OF THE DRAWINGS

It will be appreciated that the drawings are not necessarily to scale, with emphasis instead being placed on illustrating the various aspects and features of embodiments of the invention, in which.

DETAILED DESCRIPTION OF THE ILLUSTRATED EMBODIMENTS

Embodiments of the present invention are described below. It is, however, expressly noted that the present invention is not limited to these embodiments, but rather the intention is that modifications that are apparent to the person skilled in the art and equivalents thereof are also included.

Figure 1:
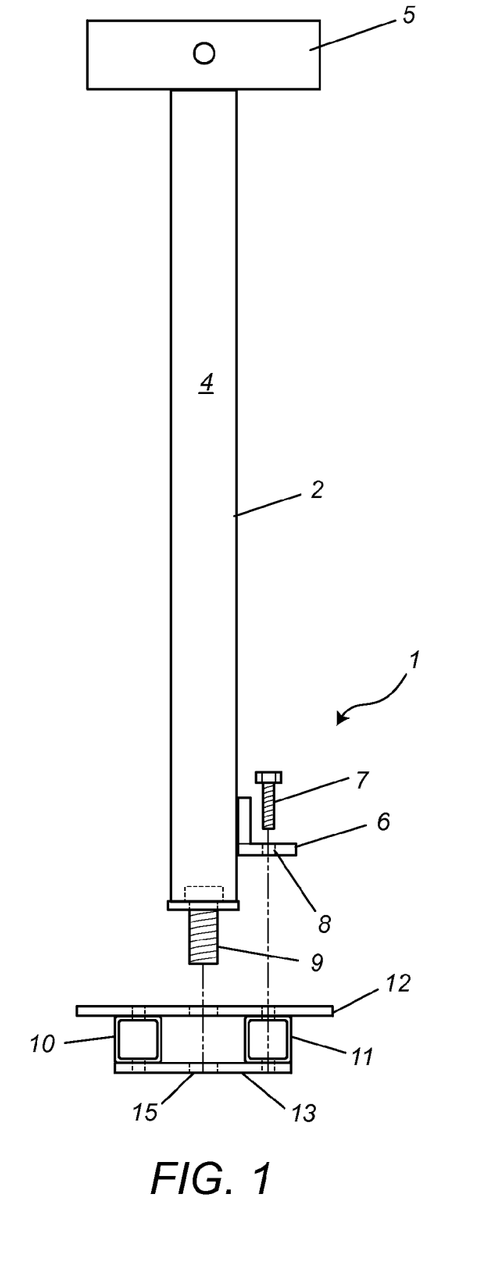
FIG. 1 is a side view of an exploded upright receiver assembly.
Figure 3:
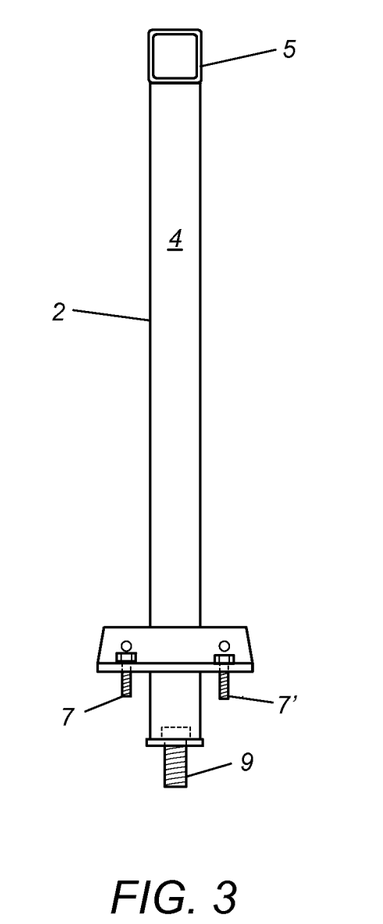
FIG. 3 is a perspective front view of an upright.
Figure 4:
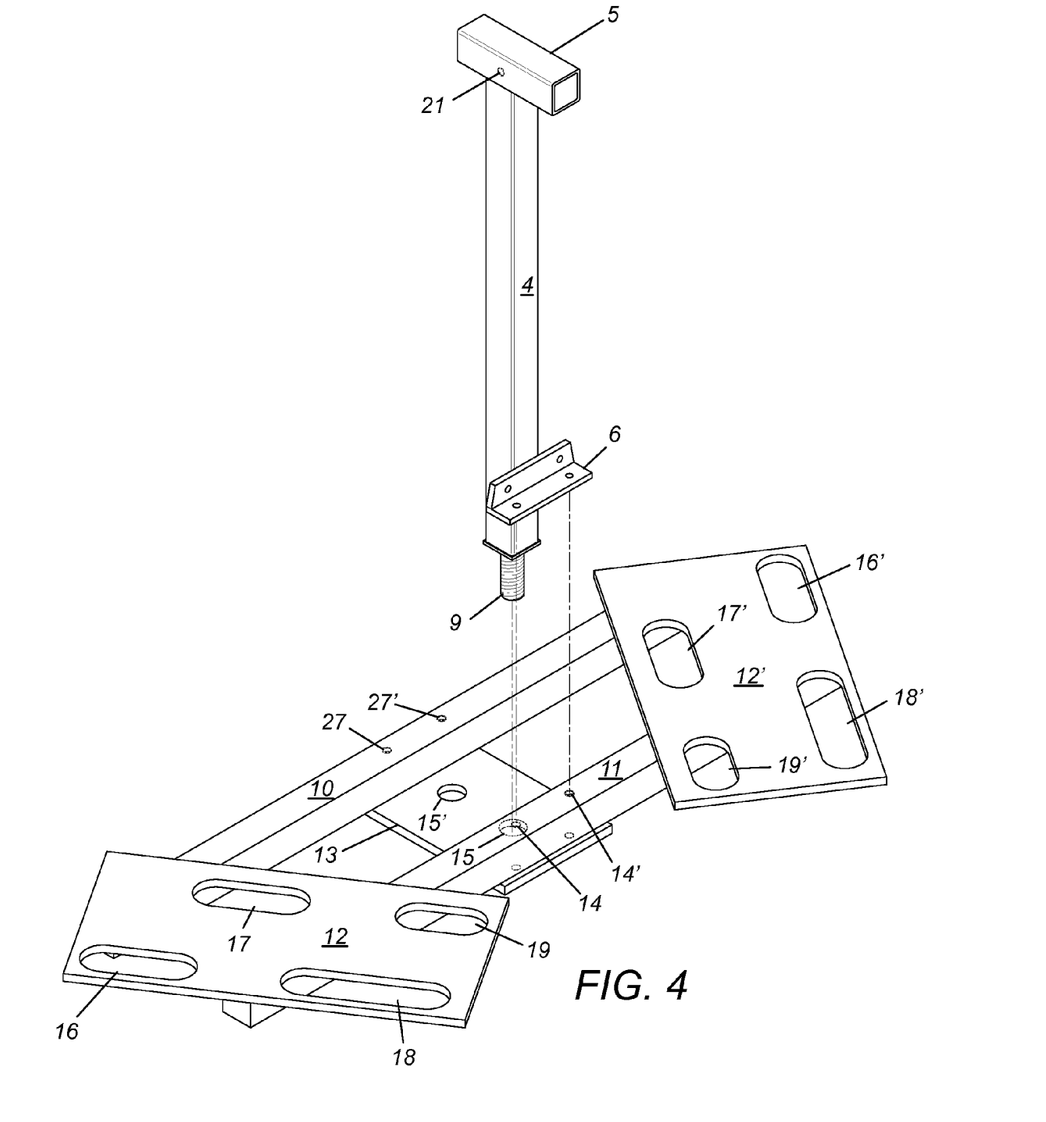
FIG. 4 is a perspective view of an exploded upright receiver assembly.

FIGS. 1, 3, and 4 show an upright receiver assembly 1 configured to releasably couple to the front of a trailer, more preferably an A-frame tongue at the front of the trailer. The upright receiver assembly 1 comprises two main pieces, an upright 2 and a base 3 that are configured to be releasably attachable to one another.

Figure 7:
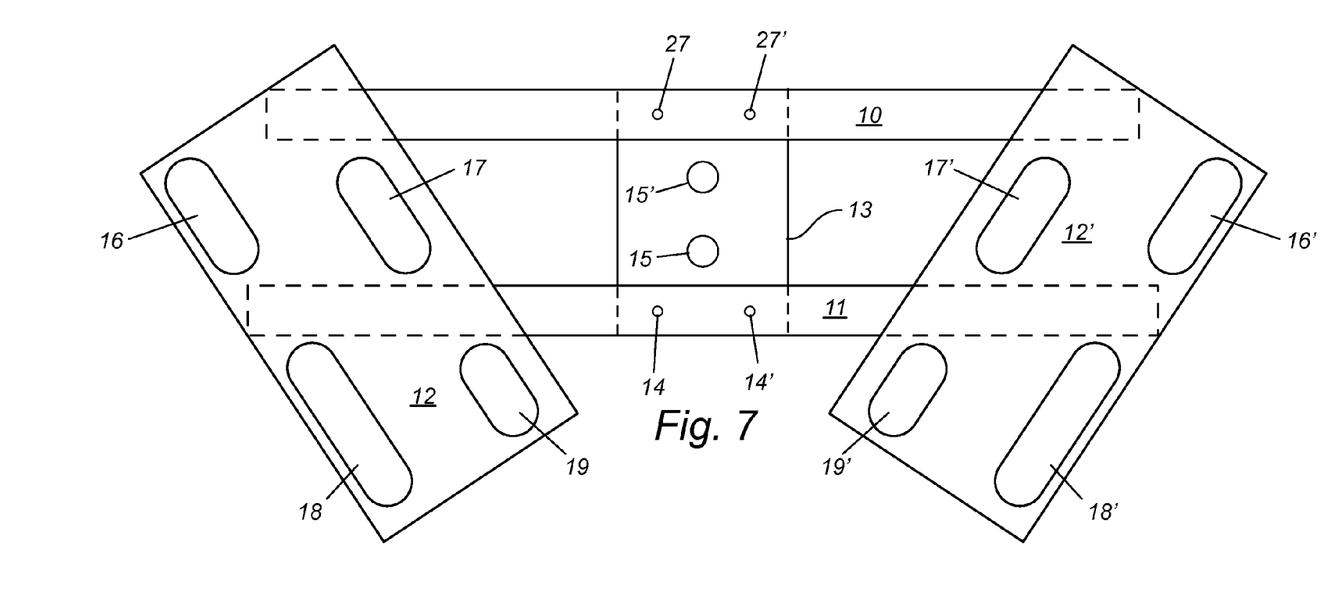
FIG. 7 is a top view of a base.
Figure 8:
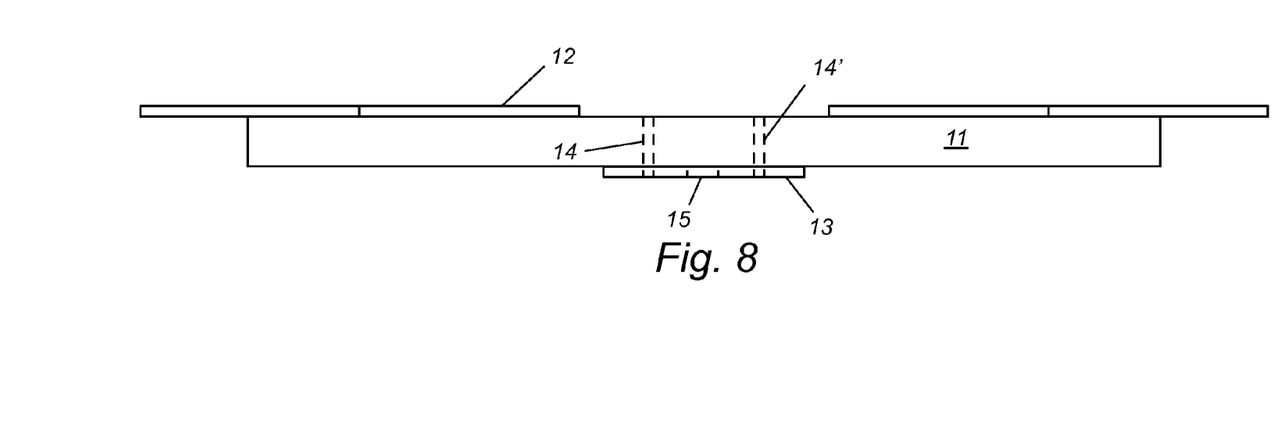
FIG. 8 is a front view of a base.

The base 3 is shown by itself in FIGS. 7 and 8, and is configured to be positioned underneath an A-frame tongue 25 of a trailer 26. A center plate 13 is coupled to 2 parallel cross bars, a front cross bar 11 and a back cross bar 10. Preferably the center plate 13 is positioned below the cross bars 11 and 10 and can be coupled to them using any suitable means, such as welding. The center plate 13 has at least a front hole 15 to receive a central bolt 9 extending downward from the upright 2.

The cross bars 11 and 10 are made of any suitable tubing and can be any suitable size, such as square or cylindrical tubing that are about 1-2" in diameter, including 1.5" square tubing. Preferably, the cross bars 11 and 10 couple to the topside of the center plate and rise above the center plate 13, preferably between 1-3" higher. The center plate could also potentially be attached above the cross bars. The distance between the front 11 and back 10 cross bars is preferably between 3-7 inches, such as 4" apart. The front cross bar 11 has one or more holes to receive bolts, such as 14 and 14'.

Figure 12:
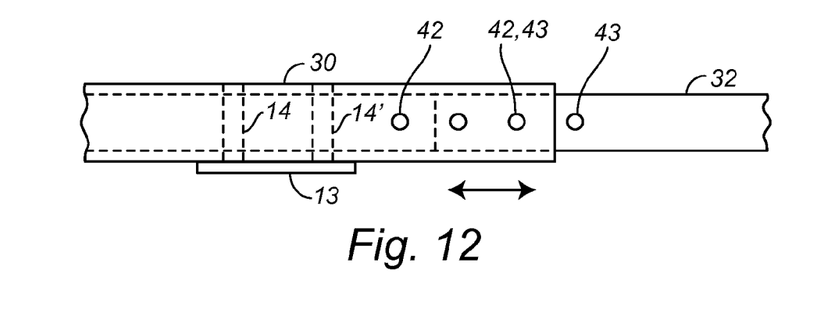
FIG. 12 is a front view of an adjustable assembly.
Figure 13:
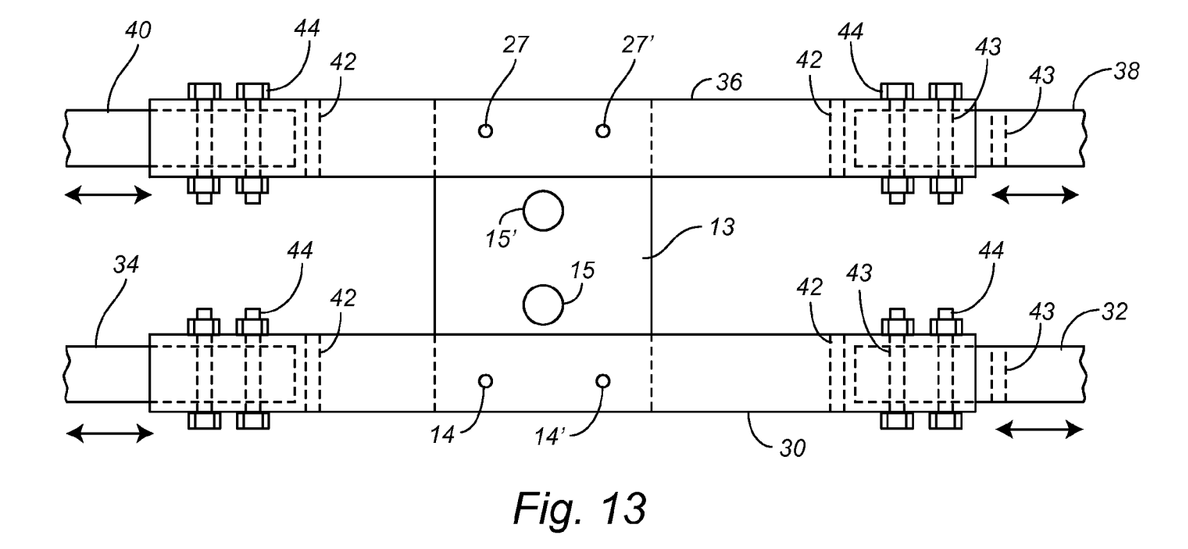
FIG. 13 is a top view of a second adjustable assembly.

According to other embodiments, such as those shown in FIGS. 12 and 13, the cross bars can be configured to be horizontally adjustable to accommodate different sized trailers 26. This can be done any suitable way, including the use of telescoping or folding cross bars.

As a non-exclusive example, these types of embodiments can include a front central cross bar 30 that is hollow and has a larger diameter than left and right side sliding extensions 32 and 34 such that they can slide within the front central cross bar 30 to create shortened and elongated cross bars that accommodate different trailer widths. The left and right side sliding extensions 32 and 34 can have holes 43, tabs or other releasable locking mechanisms that can lock the desired length in place. These holes 43 can be aligned with holes 42 within the front central cross bar 30, and locking pins or bolts 44 can be inserted through. Alternatively, the sliding extensions can be configured to slide over a central bar. Additionally it is preferred that a rear central cross bar 36 and left and right side sliding extensions 38 and 40 work the same way as described above. It is preferred that after adjustment, the left and right extensions 32 and 34 and 38 and 40 are equidistant from the center plate 13. Alternatively, the center plate can be configured to slide along the cross bar, and to releasably lock in at a desired position. These adjustable cross bars can be used for all suitable embodiments describing cross bars herein.

Figure 5:
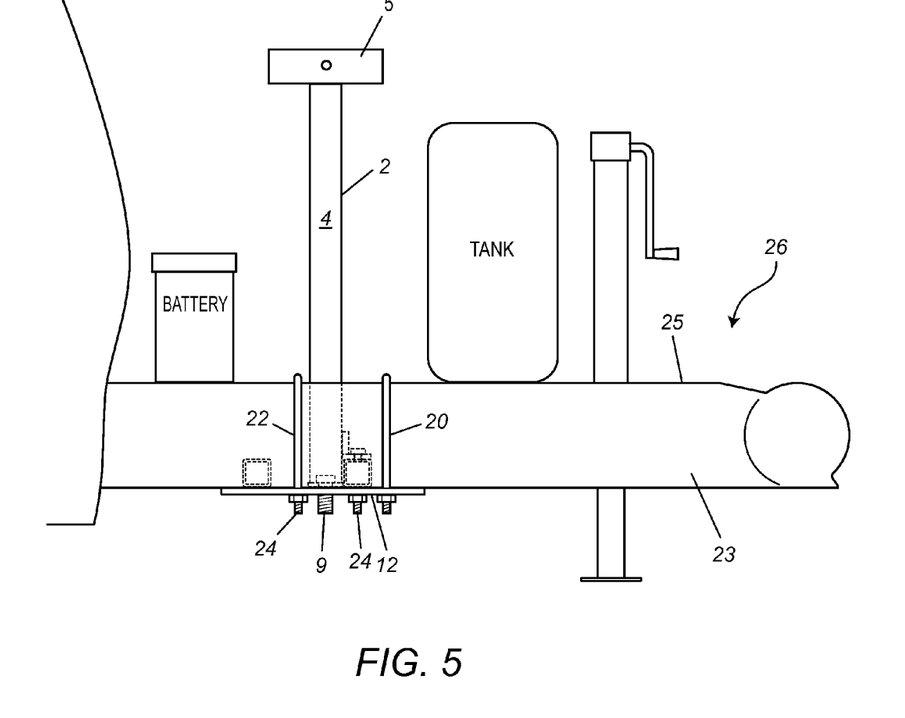
FIG. 5 is a side view of an upright receiver assembly coupled to a trailer.
Figure 6:
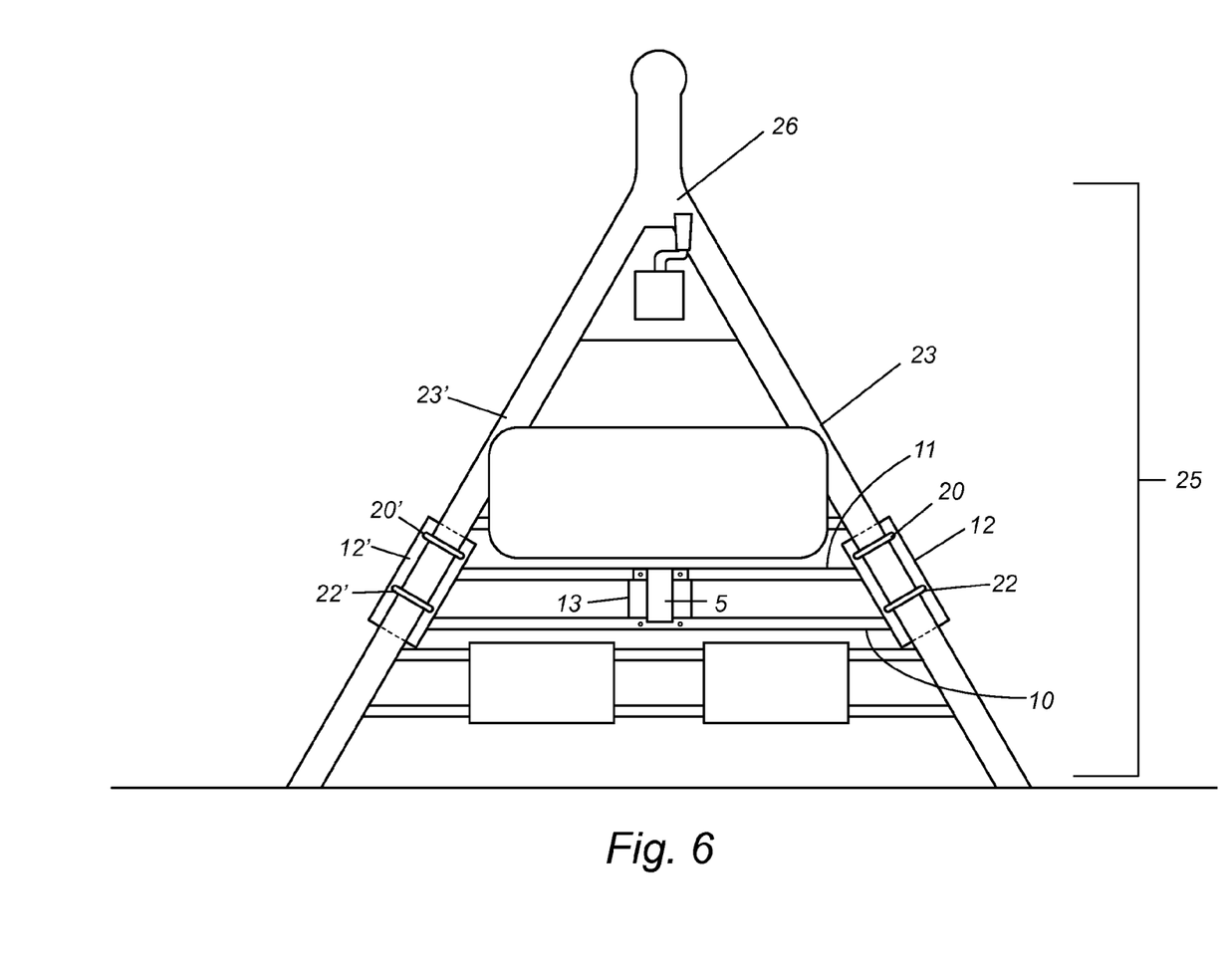
FIG. 6 is a top view of an upright receiver assembly coupled to a trailer.

At or near the ends of the cross bars 10 and 11 are two inwardly angled side plates: a right side plate 12 and a left side plate 12' whose angles should approximately correspond to the angles of the right and left sides 23 and 23' of the A-frame tongue 25, and can be between 15-35° with respect to the cross bars 10 and 11, such as 28-30°, or 25°, or approximately so. FIGS. 5 and 6 show the assembly 1 mounted to a trailer 26. To mount the assembly 1, the base 3 is positioned underneath the trailer 26 such that the topsides of the right and left side plates 12 and 12' abut against the underside of the right and left sides 23 and 23' of the A-frame tongue 25. As shown in FIGS. 5 and 6, U-bolts 20 and 22 can be positioned over the tops of the trailer's right and left sides 23 and 23' and into holes of the side plates 12 and 12'. More specifically, the right side plate 12 includes a set of front slots 18 and 19 configured to receive a first U-bolt 20 and a set of back slots 16 and 17 configured to receive a second U-bolt 22. Likewise, the left side plate 12' includes a set of front slots 18' and 19' configured to receive a first U-bolt 20' and a set of back slots 16' and 17' to receive a second U-bolt 22'. Bolts described herein, including U-bolts can be secured by nuts 24 below the trailer 26, or other suitable tightening means, including threaded holes. Any suitable nuts 24 can be used including metal, nylon, in addition to split locks and washers. The left and right slots 16-19 and 16-19' can be elongated (larger than the bolts used) to allow for adjustment side to side or front and back. The base 3 can be removed from the trailer 26 by loosening/removing the nuts 24 and taking off the U-bolts 20, 20', 22, and 22'. Preferably U-bolts and nuts are the only fastening means that secure the base 3 (and thus the assembly 1) to the trailer 26. U-bolts can be any suitable size, but are preferably 7"×2"×5/16" U-bolts.

According to further embodiments not shown, the front and rear holes on the center plate can be slotted or elongated such as with a 2" slot, for example. Additionally the holes in the front and rear cross bars and the holes in the platform can also be slotted and elongated (e.g., a 2" slot) to preferably align with another when the upright and base are attached together. Slots allow for a more custom fits with the bolts and can allow side to side and/or front to rear adjustment of the assembly. A wider (e.g., 6") center base plate can be used to accommodate the elongated slots. The upright post can then be secured with the same bolts as were to be used prior to the modifications.

Figure 2:
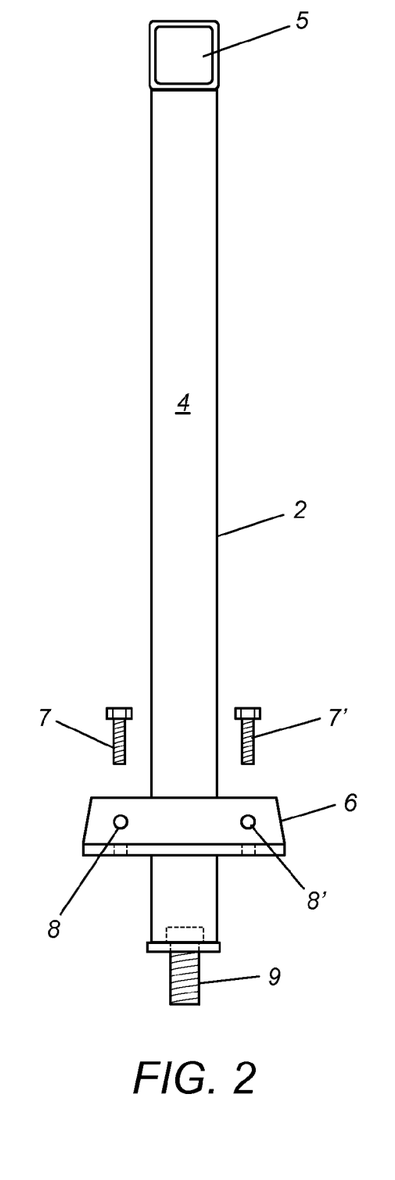
FIG. 2 is a front view of an upright.

As shown in FIG. 2, the upright 2 comprises a vertical post 4 having a receiver 5 positioned at or near the top. Preferably the receiver 5 has a horizontal facing opening configured to receive standard bike racks, cargo trays/carriers, or other hitch mounted accessories. Preferred receiver openings are 2"×2" square receivers. Additional embodiments include 1.25"×1.25" square receivers or 2.5"×2.5" square receivers, although other suitable sizes can be used as well. The receiver can be any suitable class rating of receiver including I, II, III, IV, V. According to further embodiments more than one receiver can be used together, such as two receivers. For example, two receivers can be stacked directly on top of each other, or alternatively positioned horizontally with respect to each other. Preferably the upright 2 is made of metal, and more preferably steel, although, any suitable load bearing material can be used. A hole 21 for receiving a locking pin can be positioned any suitable place on the receiver 5, including the middle of the side of the receiver 5. The receiver 5 is coupled to the top, or near the top of the vertical post 4 using any suitable means, such as welding.

The vertical post 4 can be any suitable height width and depth, but is preferably made of 1.5" tubing, or between 1"-3" tubing. Tubing can have a square or circular cross section. Any suitable height of upright 2 can be used but is preferably between, 20-40", or 30-40", such as 23" or 34" high from the base 3.

The underside of the post 4 preferably including means for releasably attaching to the base 3, and can be a welded bolt 9 or any other suitable means. According to preferred means, the bolt 9 is welded to a suitable flat washer within the post 4, such as a 2"×2" washer. The center bolt 9 can be any suitable size but is preferably between 1-2" long, such as 1.25" and is 0.5" in width.

Near the bottom of the vertical post 4 a horizontal platform 6 can extend out from the front side. The platform 6 can be a plate that extends outward in the same direction of the receiver's 5 opening. This platform 6 can include a way of attaching to the front or rear cross bars 11 and 10 such as holes 8 and 8' configured to receive bolts 7 and 7' respectively. Any suitable holes and bolts can work, but 3.5" bolts 7 and 7' are preferred. The horizontal platform 6 is preferably not positioned at the bottom of the vertical post 4 but is raised to the height of the topside of either the front or back cross bars 11 and 10 from the center plate 13 of the base 3. This height can be any suitable height, but is preferably 1"-2" inches high, such as 1.5". While any suitable dimensions can work, the horizontal platform 6 can be a piece of angle iron, such as 1.5"×1.5" and extends 4"-6" outward, such as 5". When the upright 2 is positioned on top of the base 3, the platform 6 is configured to rest on the top of the front cross bar 11 such that the holes 8 and 8' are configured to align with holes 14 and 14', and the bolts 7 and 7' can traverse through. When the bolts 7 and 7' traverse through the front cross bar's 11 holes 14 and 14' the center bolt 9 is configured to traverse through a front hole 15 in the center plate 13 of the base 3. Bolts described herein can be secured by nuts 24 below, or other suitable tightening means, including threaded holes. Any suitable nuts 24 can be used including metal, nylon, in addition to split locks and washers. The upright 2 can readily be detached from the base 3 by simply removing the nuts from the bolts. The assembly 1 should be attached to a trailer 26 such that the upright 2 is positioned away from the A-frame cross beam of the trailer 26.

According to further embodiments, the center plate 13 and rear cross bar 10 can be configured to accommodate a rear facing upright 2, configured such that the receiver 5 opens in a rear facing direction. According to this embodiment, the center plate 13 includes a rear hole 15' to receive a central bolt 9 extending downward from the upright 2. The rear cross bar 10 has a plurality of holes to receive bolts, such as 27 and 27'.

Any suitable materials can be used to make the assemblies 1 described herein, so long as they provide sufficient load bearing support to the receiver hitch 5 and the rack and cargo attached therein. Preferred materials include metal, such as steel, for example.

The invention may be embodied in other specific forms besides and beyond those described herein. The foregoing embodiments are therefore to be considered in all respects illustrative rather than limiting, and the scope of the invention is defined and limited only by the appended claims and their equivalents, rather than by the foregoing description.

The invention claimed is:

1. An upright receiver assembly for attachment to a trailer comprising: a base comprising (La center plate having the following sides: top, under, front, back, left, and right, (b) front and rear cross bars having the following sides: top, under, front, back, left, and right, and (c) left and right side plates; wherein the center plate is and coupled to the undersides of the front and rear cross bars, that are parallel to one another and individually extend outwardly from the left and right side of the center plate; wherein the left extensions of the cross bars couple to a left side plate and the right extensions of the cross bars couple to a right side plate, wherein the right and left side plates are angled inward with respect to each other in front of the center plate; and an upright having a post that extends upwardly and a receiver hitch positioned at or near the top of the post with a forward facing opening, the post having a lower end configured to be releasably attachable to the top side of the center plate, wherein the upright comprises a front extending platform configured to rest on the topside of the front cross bar when the upright is attached to the base and the front cross bar comprises a hole configured to receive a bolt, and the front extending platform comprises a hole configured to receive a bolt that aligns with front cross bar hole when the upright is attached to the base.

2. The upright receiver assembly of claim 1, wherein the rear cross bar comprises a hole configured to receive a bolt that aligns with the platform hole when the upright is attached to the base.

3. The upright receiver assembly of claim 1, wherein the front and rear cross bars are coupled to the undersides of the left and right side plates.

4. The upright receiver assembly of claim 1, further comprising a bike or cargo rack releasably attached into the receiver hitch.

5. The upright receiver assembly of claim 1, wherein the receiver hitch is a 2" square receiver hitch.

6. The upright receiver assembly of claim 1, wherein the front and rear cross bars are extendible to accommodate different sized trailers.

7. An upright receiver assembly for attachment to a trailer comprising: a base comprising (a) a center plate having the following sides: top, under, front, back, left, and right, (b) front and rear cross bars having the following sides: top, under, front, back, left, and right, and (c) left and right side plates; wherein the center plate is coupled to the undersides of the front and rear cross bars, that are parallel to one another and individually extend outwardly from the left and right side of the center plate; wherein the left extensions of the cross bars couple to a left side plate and the right extensions of the cross bars couple to a right side plate, wherein the right and left side plates are angled inward with respect to each other in front of the center plate and have slots configured to receive a U-bolt; and an upright having a post that extends upwardly and a receiver hitch positioned at or near the top of the post with a forward facing opening, the post having a lower end configured to be releasably attachable to the top side of the center plate, wherein the upright comprises a front extending platform configured to rest on the topside of the front cross bar when the upright is attached to the base and the front cross bar comprises a hole configured to receive a bolt, and the front extending platform comprises a hole configured to receive a bolt that aligns with front cross bar hole when the upright is attached to the base.

8. A travel trailer comprising: an enclosure configured for people to sleep or live inside; an A-frame tongue positioned in front of the enclosure having converging left and right sides; a base configured to be releasably attachable to the A-frame tongue comprising (a) a center plate having the following sides: top, under, front, back, left, and right, (b) front and rear cross bars having the following sides: top, under, front, back, left, and right, and (c) left and right side plates; wherein the center plate is coupled to the undersides of the front and rear cross bars, that are parallel to one another and individually extend outwardly from the left and right side of the center plate; wherein the left extensions of the cross bars couple to a left side plate and the right extensions of the cross bars couple to a right side plate, wherein the right and left side plates are angled inward with respect to each other in front of the center plate and are positioned underneath the left and right sides of the A-frame tongue and U-bolts are positioned over the left and right sides of the A-frame tongue; and an upright having a post that extends upwardly and a receiver hitch positioned at or near the top of the post with a forward facing opening, the post having a lower end configured to be releasably attachable to the top side of the center plate, wherein the upright comprises a front extending platform configured to rest on the topside of the front cross bar when the upright is attached to the base and the front cross bar comprises a hole configured to receive a bolt, and the front extending platform comprises a hole configured to receive a bolt that aligns with front cross bar hole when the upright is attached to the base.

9. The trailer of claim 8, wherein the rear cross bar comprises a hole configured to receive a bolt that aligns with the platform hole when the upright is attached to the base.

10. The trailer of claim 8, further comprising a bike or cargo rack releasably attached into the receiver hitch.

11. The trailer of claim 8, wherein the receiver hitch is a 2" square receiver hitch.

12. The upright receiver assembly of claim 8, wherein the front and rear cross bars are extendible.

* * * * *